(12) United States Patent
Yoshigae (10) Patent No.: US 8,842,303 B2
(45) Date of Patent: Sep. 23, 2014

(54) IMAGE READING DEVICE AND IMAGE FORMING APPARATUS WITH UNIT DETERMINING LIGHT-EMITTING ELEMENT ABNORMALITY

(71) Applicant: Takahisa Yoshigae, Kanagawa (JP)

(72) Inventor: Takahisa Yoshigae, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 10 days.

(21) Appl. No.: 13/684,727

(22) Filed: Nov. 26, 2012

(65) Prior Publication Data

US 2013/0163018 A1     Jun. 27, 2013

(30) Foreign Application Priority Data

Dec. 22, 2011  (JP) ................................. 2011-281548

(51) Int. Cl.
*G06F 3/12* (2006.01)
*H04N 1/00* (2006.01)
*H04N 1/028* (2006.01)

(52) U.S. Cl.
CPC ........ *H04N 1/00013* (2013.01); *H04N 1/02865* (2013.01); *H04N 1/00037* (2013.01)
USPC ........... 358/1.13; 358/448; 358/1.15; 358/1.1

(58) Field of Classification Search
USPC ......................................... 358/1.15, 1.1, 448
See application file for complete search history.

(56) References Cited

U.S. PATENT DOCUMENTS

| | | | |
|---|---|---|---|
| 2007/0242155 A1 | 10/2007 | Yoshigae | |
| 2009/0213442 A1 | 8/2009 | Yoshigae | |
| 2010/0177364 A1 | 7/2010 | Yoshigae | |
| 2011/0063689 A1 | 3/2011 | Yoshigae | |
| 2011/0063693 A1 | 3/2011 | Yoshigae | |
| 2011/0085214 A1* | 4/2011 | Shinkawa | 358/475 |

FOREIGN PATENT DOCUMENTS

| | | |
|---|---|---|
| JP | 2007-150934 | 6/2007 |
| JP | 2011-087012 | 4/2011 |

* cited by examiner

*Primary Examiner* — Benny Q Tieu
*Assistant Examiner* — Martin Mushambo
(74) *Attorney, Agent, or Firm* — Oblon, Spivak, McClelland, Maier & Neustadt, L.L.P.

(57) ABSTRACT

In an embodiment, provided is an image reading device that includes: a light source that includes a first block and a second block arranged alternately, both blocks including light-emitting elements arranged linearly, the first and the second block lighting independently, and the light-emitting elements in a same block of the first and the second block lighting at a same time; a scanning unit that scans a document by irradiating the document with light from the light source; a lighting control unit that lights one of the first and the second block of the light source and then lights the other; a peak level acquiring unit that acquires a peak level of scanned data of each of the first and the second block; and an abnormality determining unit that determines that the light-emitting element is abnormal when the peak level becomes equal to or smaller than a given value.

11 Claims, 6 Drawing Sheets

IMAGE READING DEVICE AND IMAGE FORMING APPARATUS WITH UNIT DETERMINING LIGHT-EMITTING ELEMENT ABNORMALITY

CROSS-REFERENCE TO RELATED APPLICATIONS

The present application claims priority to and incorporates by reference the entire contents of Japanese Patent Application No. 2011-281548 filed in Japan on Dec. 22, 2011.

BACKGROUND OF THE INVENTION

1. Field of the Invention

The present invention relates to an image reading device and an image forming apparatus that can detect abnormality of a light-emitting element with a simple configuration.

2. Description of the Related Art

The light-emitting diode (LED) is in practical use as a light source for scanning images in multifunction peripherals (MFP), scanners, etc., instead of Xenon lamps frequently used conventionally. The use of the LED as a light source shortens rise time, improves energy saving, and prolongs lifetime. When the LED is adopted for a lighting system, the distance between a document face and an image sensor becomes longer, which makes light attenuation greater and thus requires higher illuminance on the document face, as compared with a case of an equal-magnification optical system. Therefore, arrangement of a plurality of LEDs in array in a main-scanning direction is practiced to increase illuminance on the document face.

In such a lighting system using LEDs, there is generally employed a form in which the LEDs connected in a series circuit are arranged in a main-scanning direction to irradiate the main-scanning direction. However, this form requires circuits connected individually to LEDs so as to provide them with an electric current, which makes a circuit configuration complicated. For this reason, there is adopted a configuration in which linearly-arranged LEDs are divided to some blocks and a drive circuit capable of providing each of the blocks with an electric current is connected to the blocks.

However, with such a configuration, when LEDs have any trouble in LEDs, scanning is not performed normally, and thus abnormal images are formed. Therefore, a technique for detecting abnormality of LEDs is adopted. In the image reading device described in Japanese Patent Application Laid-open No. 2011-087012, the LEDs are connected in a manner such that they can be lighted in a plurality of blocks; and scanned data is obtained in blocks using a white reference plate so as to determine abnormality based on a peak level of the data. In the image reading device described in Japanese Patent Application Laid-open No. 2007-150934, a drive circuit for providing an electric current to each of blocks is provided, and the abnormality is determined detecting an abnormal value of a driving current.

However, in the method described above in which the LEDs are lighted in blocks to detect abnormality of LEDs of each block, a circuit configuration for lighting each of blocks becomes complicated. Moreover, if a current detection circuit is newly provided for detecting abnormality of LEDs, the circuit becomes more complicated.

There is a need of providing an image reading device and an image forming apparatus that can detect abnormality of a light-emitting element with a simplified circuit configuration.

SUMMARY OF THE INVENTION

It is an object of the present invention to at least partially solve the problems in the conventional technology.

According to an embodiment, provided is an image reading device that includes: a light source that includes a first block and a second block arranged alternately, both blocks including a plurality of light-emitting elements arranged linearly, the first block and the second block lighting independently, and the light-emitting elements in a same block of the first block and the second block lighting at a same time; a scanning unit that scans a document by irradiating the document with light from the light source; a lighting control unit that lights one of the first block and the second block of the light source and then lights the other; a peak level acquiring unit that acquires a peak level of scanned data of each of the first block and the second block while the blocks are lighted by the lighting control unit; and an abnormality determining unit that determines that the light-emitting element is abnormal when the peak level becomes equal to or smaller than a given value.

According to another embodiment, provided is an image forming apparatus that includes the image reading device mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
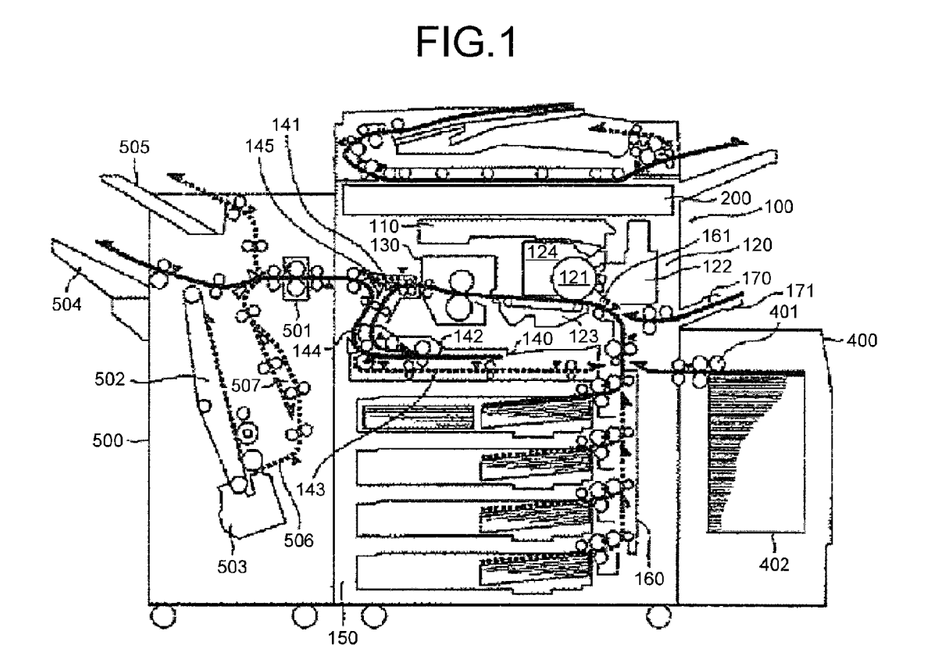
FIG. 1 is a vertical section illustrating an entire configuration of an image forming apparatus.

With reference to the enclosed drawings, an embodiment of an image reading device is described in detail. FIG. 1 is a vertical section illustrating a configuration of the image forming apparatus of the embodiment.

An image forming apparatus 100 illustrated in FIG. 1 has an image writing unit 110, an image forming unit 120, a fixing unit 130, a duplex conveying unit 140, a paper feeding unit 150, a vertical conveying unit 160, a manual-feed unit 170, and an image reading device 200. The image writing unit 110 modulates LEDs as light emitting sources based on image information of a document read out by the image reading device 200, and writes a latent image on a photosensitive drum 121 adjusting a scanning optical system such as a polygon mirror and an fθ lens. The image forming unit 120 has the photosensitive drum 121, a developing unit 122 provided along the circumference of the photosensitive drum 121, a transferring unit 123, and a cleaning unit 124, and forms images by electrophotography.

The fixing unit 130 fixes images transferred by the transferring unit 123 onto transfer paper. The duplex conveying unit 140 is provided in the downstream in a conveying direction of the fixing unit 130, and has a first switching claw 141 that switches a conveying direction of transfer paper to the side of a paper post-processing device 500 or the side of the duplex conveying unit 140, a reverse conveying path 142 to which transfer paper is introduced when the first switching claw 141 changes a path thereto, an image formation side conveying path 143 that conveys transfer paper reversed on the reverse conveying path 142 to the side of the transferring unit 123 again, and a post-processing side conveying path 144 that conveys the reversed transfer paper to the side of the paper post-processing device 500. At the bifurcation between the image formation side conveying path 143 and the post-processing side conveying path 144, a second switching claw 145 is provided.

The paper feeding unit 150 has four feeding rows. Transfer paper in each of the feeding rows is brought out by a pick-up roller and a paper feeding roller, and introduced to the vertical conveying unit 160. The vertical conveying unit 160 conveys transfer paper introduced from the feeding rows to a registration roller 161 provided in the upstream in a paper conveying direction of the transferring unit 123. Then, the registration roller 161 feeds transfer paper to the transferring unit 123 in timing with image heads of visualized images on the photosensitive drum 121. The manual-feed unit 170 has a manual-feed tray 171 that can be opened and closed freely. The manual-feed tray 171 is opened to feed transfer paper manually, if necessary. Also in this case, the registration roller 161 conveys transfer paper adjusting conveying timing.

A large capacity feeding device 400 stores therein a large number of sheets of transfer paper with the same size, and feeds them. As the transfer paper is consumed, a base plate 402 moves up, and thus it is possible to constantly pick up paper from a pickup roller 401. The transfer paper fed from the pickup roller 401 is conveyed from the vertical conveying unit 160 to the nip of the registration roller 161.

The paper post-processing device 500 performs given post-processing such as punching, adjustment, stapling, and classification. In the embodiment, the paper post-processing device 500 has a punch 501, a stapling tray (adjustment) 502, a stapler 503, and a shift tray 504. That is, the transfer paper conveyed to the paper post-processing device 500 from the image forming apparatus 100 is subjected to punching processing, when performed, one by one by the punch 501. Then, when the subsequent post-processing is not performed, the transfer paper is discharged to a proof tray 505. When sorting, stacking, or classification is performed, the transfer paper is discharged to the shift tray 504. Classification is performed in a manner such that the shift tray 504 is reciprocated with a given amount in a direction orthogonal to a paper conveying direction. Alternatively, the classification can be performed in a manner such that paper is moved on a paper conveying path in a direction orthogonal to a paper conveying direction.

When adjustment is performed on the transfer paper, the punched or unpunched transfer paper is introduced to a lower conveying path 506 adjusted by a back end fence of the shift tray 504 regarding a direction orthogonal to a paper conveying direction; and adjusted by a jogger fence of the shift tray 504 regarding a direction parallel to a paper conveying direction. Here, when binding is performed, the adjusted paper bulks are bound by the stapler 503 at given positions, e.g. corners, or two positions in the center, and discharged to the shift tray 504 by a discharge belt. The lower conveying path 506 is provided with a pre-stack conveying path 507. The pre-stack conveying path 507 stacks a plurality of sheets of paper in conveyance, which prevents interruption of image forming action on the side of the image forming apparatus 100 during post-processing.

Figure 2:
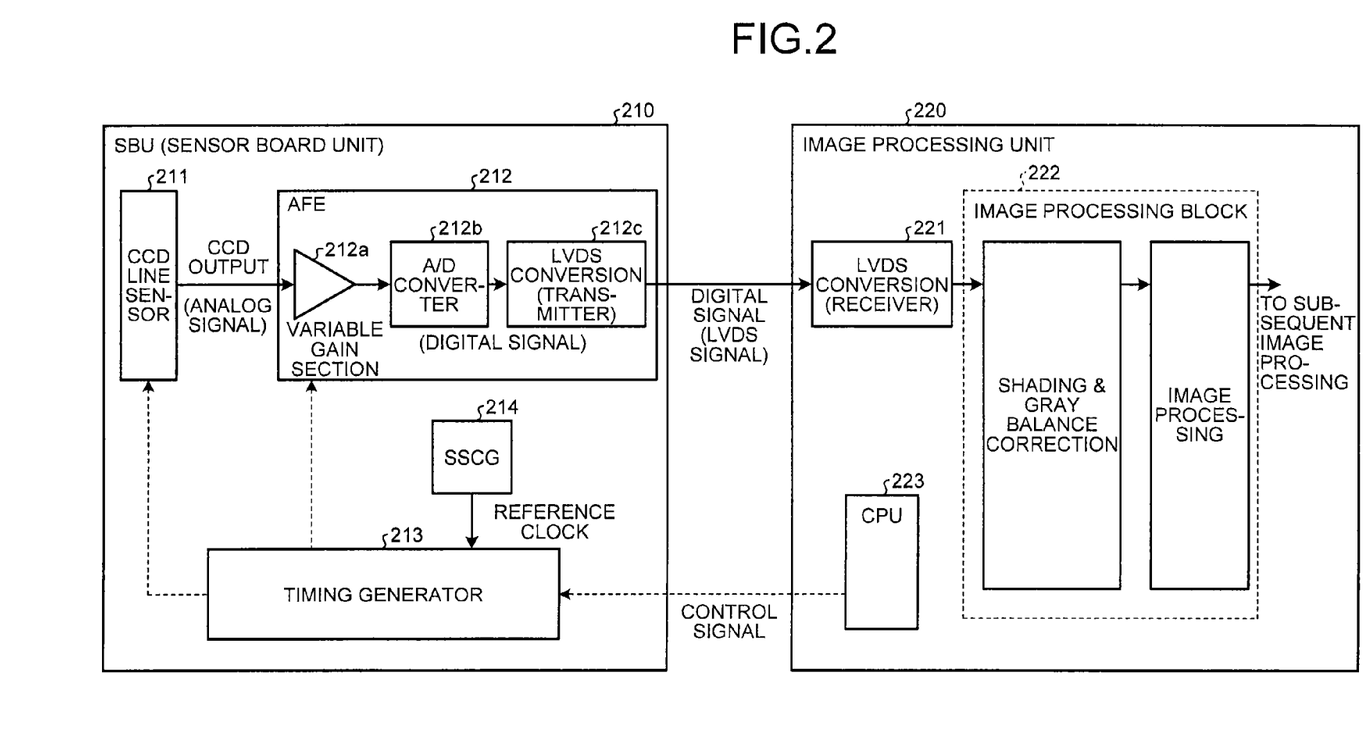
FIG. 2 is a block diagram illustrating a hardware configuration of an image reading device.

FIG. 2 is a block diagram illustrating a functional configuration of the image reading device 200. As illustrated in FIG. 2, the image reading device 200 includes a sensor board unit (SBU) 210, and an image processing unit 220. The SBU 210 has a charge coupled device (CCD) line sensor 211, an analog front end (AFE) 212, a timing generator 213, and a spread spectrum clock generator (SSCG) 214. The AFE 212 has a variable gain section 212a, an analog-to-digital (A/D) converter 212b, and a low voltage differential signaling (LVDS) transmitter 212c.

The SSCG 214 modulates the frequency of a clock, and outputs the modulated clock to the timing generator 213 as a reference clock. The timing generator 213 outputs control signals that control the CCD line sensor 211 and the AFE 212 using the recommended reference clock input. The CCD line sensor 211 receives light reflected on a document on which light from a light source (not shown) is incident, and converts the reflected light to analog electric signals (hereinafter, simply referred to as analog signals). The AFE 212 amplifies the analog signals input from the CCD line sensor 211; converts the amplified analog signals to digital signals; and then transfers the resulting digital signals to the image processing unit 220. That is, in the AFE 212, the variable gain section 212a amplifies the analog signals input from the CCD line sensor 211, and then the A/D converter 212b converts the amplified analog signals to digital signals. Furthermore, the LVDS transmitter 212c converts the digital signals output from the A/D converter 212b to LVDS signals, and transfers the resulting LVDS signals to the image processing unit 220.

The image processing unit 220 has an LVDS receiver 221, an image processing block 222, and a central processing unit (CPU) 223. In the image processing block 222, image processing is performed after shading correction and gray balance correction. The shading correction is processing for correcting decrease of a light amount at end portions in a main-scanning direction principally due to optical characteristics of a lens. In the shading correction, data acquired by scanning white reference plate is retained for each pixel, and normalization processing is performed on each pixel of the scanned data to correct distribution in a main-scanning direction. The gray balance correction is of a processing for correcting optical characteristic dispersion of a light source, a lens, a CCD, etc. In the gray balance correction, each value of the colors R, G, and B is multiplied by a correction coefficient so that the document scanned level becomes a setting value. The correction coefficient is calculated based on a deviation amount between data obtained by scanning a document for adjustment and a setting value. The LVDS receiver 221 restores the original digital signals from the LVDS signals received from the SBU 210. The CPU 223 controls the timing generator 213.

Figure 3:
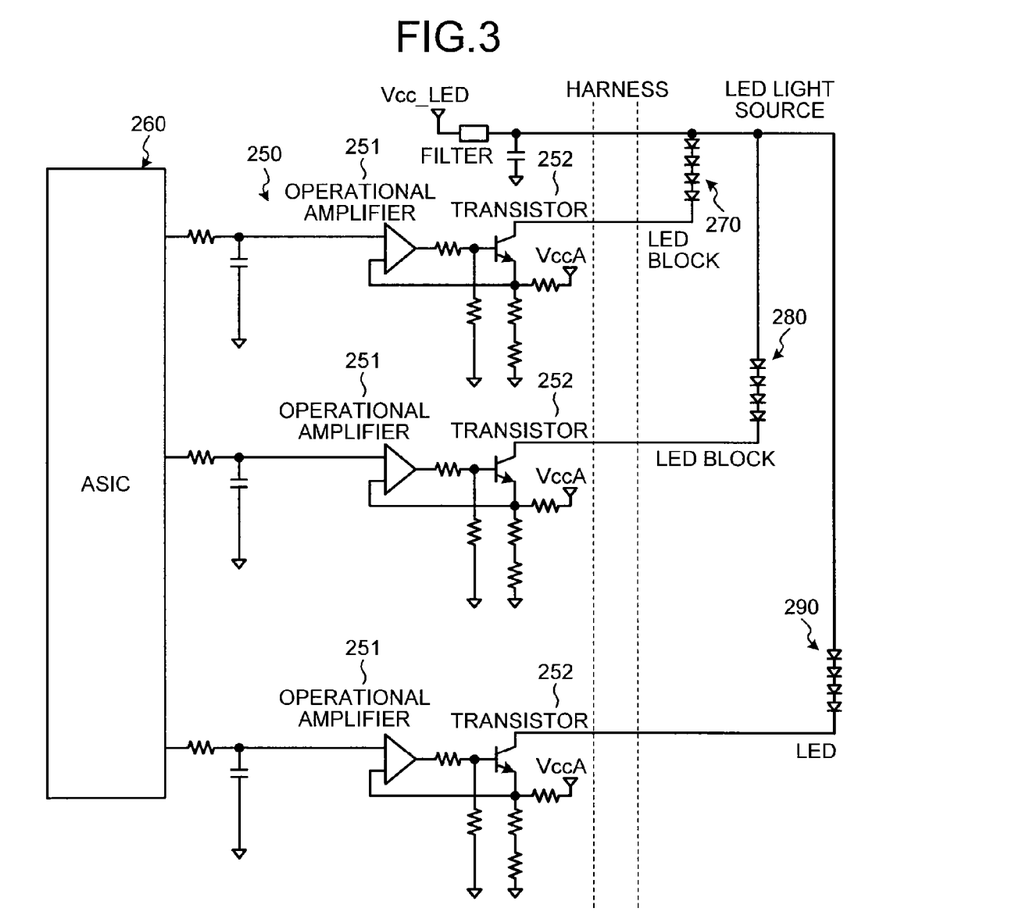
FIG. 3 is a configuration diagram of a lighting circuit of the image reading device.

FIG. 3 is a configuration diagram of an LED lighting drive circuit of the embodiment that lights a light source. As illustrated in FIG. 3, an LED lighting drive circuit 250 is connected to an application specific integrated circuit (ASIC) 260 as an electric current providing circuit; and voltage for lighting control is input from the ASIC 260. The LED lighting drive circuit 250 has three divided LED blocks 270, 280, and 290, and each of the LED blocks 270, 280, and 290 is provided with a constant current obtained through conversion by a buffer circuit constituted, for each block, in a combination of an operational amplifier 251 and a transistor 252. In each of the LED blocks 270, 280, and 290, four LEDs as light-emitting elements are connected in series. Therefore, in the LED blocks 270, 280, and 290, if even one of four LEDs is abnormal, an electric current cannot be provided to any of LEDs of the same block, which disables lighting in the entire block.

There are two kinds of LED abnormal modes: a short mode and an open mode. The open mode is general abnormality which could occur in LEDs, in which the flow of an LED operating current higher than a rated value due to particular causes burns an LED inner circuit to be cut out, for example, and disconnects the terminals of LEDs thereby disabling an electric current flow. The short mode is a state in which an LED inner circuit is shorted out due to particular causes. In the latter case, there are two possibilities, that is, the LEDs are lighted or unlighted.

Figure 4:
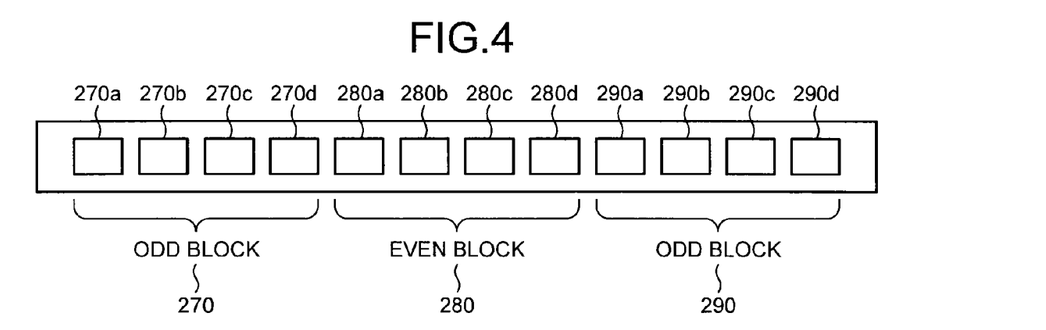
FIG. 4 is a schematic view illustrating an example of a block configuration of LEDs.

FIG. 4 is a schematic view illustrating the arrangement of the LED blocks 270, 290, and 290. As illustrated in FIG. 4 in the embodiment, the LED block 270 and the LED block 290 correspond to odd blocks (first block); while the LED block 280 corresponds to an even block (second block). The even block and the odd blocks are arranged alternately. The LEDs are arranged linearly so that the main-scanning distribution in a main-scanning direction on a document face is flat. Light emitted from a plurality of LEDs arranged adjacent to each other is overlapped, which forms flat distribution. In the embodiment, the lighting of the LED block 270 and the LED block 290 are controlled with common output signals from the ASIC 260, while the lighting of the LED block 280 is controlled with output signals different from those controlling the odd blocks. In this way, the lightning is not performed at the same timing in both of the blocks adjacent to each other, which makes it possible to detect abnormality of each block more accurately in LED abnormality detection.

The ASIC 260 can output lighting control voltage to the LED blocks 270, 280, and 290, in odd blocks and even blocks as described above, so as to control lightning of the blocks. The ASIC 260 can also output lighting control voltage so as to light all of the LED blocks 270, 280, and 290 at the same time. Moreover, the ASIC 260 can adjust output of lighting control voltage so as to adjust an LED light emitting level. The adjustment of lighting control voltage output from the ASIC 260 can be realized by a digital-to-analog (D/A) convertor, for example. As other method, an inexpensive configuration is possible using a pulse-width-modulation (PWM) DAC.

The LED abnormality detection is realized by a program. Thus, the LED lighting drive circuit 250 is of simple circuit configuration not including an abnormality detecting function, which can reduce costs.

Figure 5A:
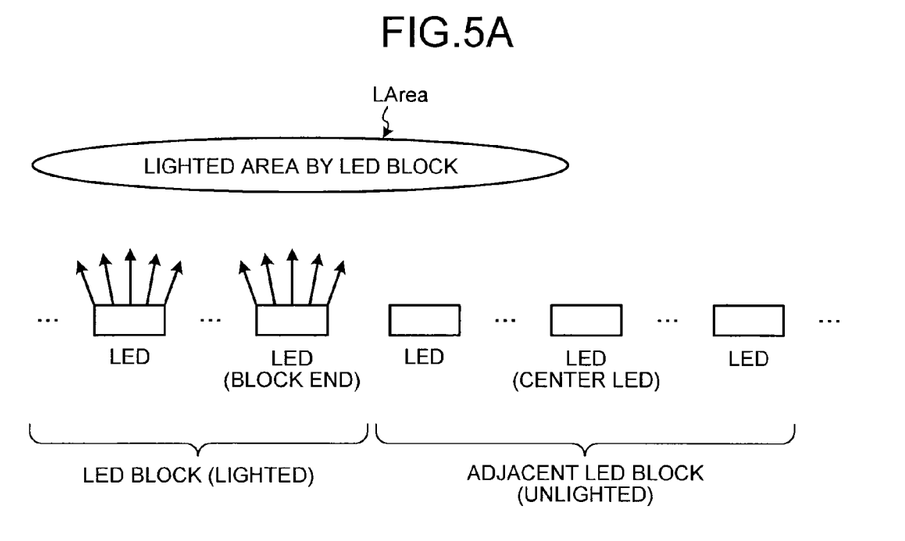
FIGS. 5A and 5B are schematic views illustrating a state when the LEDs are lighted.
Figure 5B:
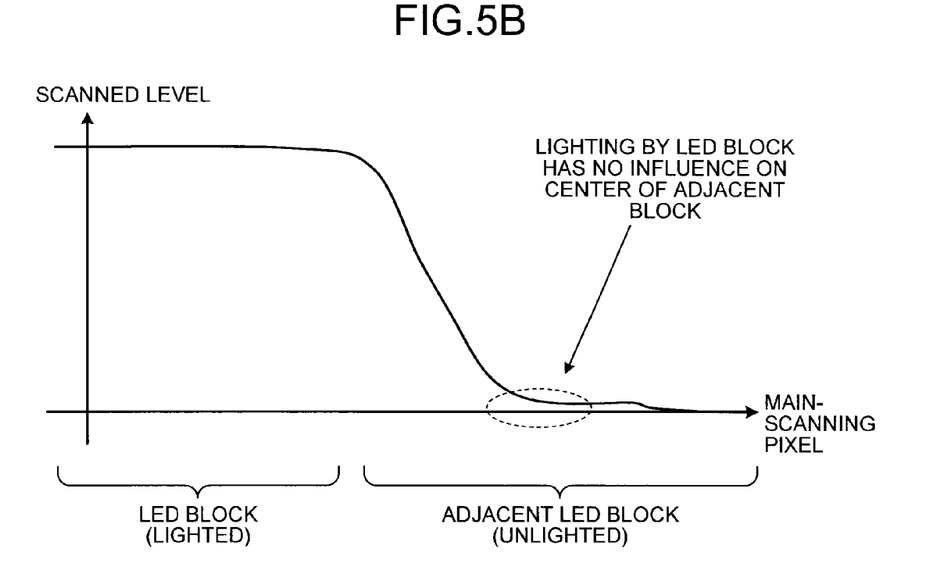

Next, the arrangement of LEDs is described with reference to FIGS. 5A and 5B. As illustrated in FIG. 5A, regarding a lighted LED block, a lighted area (LArea) by an LED positioned at an end of the block is set so as not to reach an LED positioned at the center of the adjacent LED block. FIG. 5B is a graph representing a scanned level acquired in the state of FIG. 5A with the LED block lighted. The scanned level is of data acquired from light reflected on a white reference plate when a light source is lighted. As illustrated in FIG. 5B, the LED scanned level is substantially flat in an area corresponding to the lighted LED block. The scanned level starts to decline from a boundary between the lighted LED block and the unlighted LED block, and becomes nearly 0 around the center of the unlighted LED block. Therefore, there is no influence of the adjacent LED block, and thus abnormality can be detected accurately for each block.

Figure 6A:
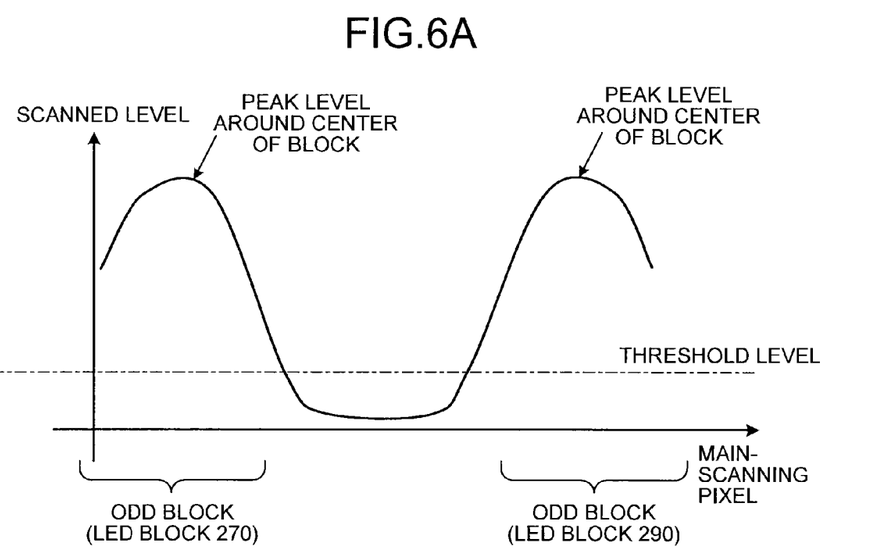
FIGS. 6A and 6B are graphs illustrating a scanned level when odd blocks are lighted.

Subsequently, method of LED abnormality detection is described with reference to FIGS. 6A, 6B, 7A and 7B. First, the control of lighting at the same time the LED blocks 270 and 290 as odds blocks is performed. The illuminance distribution in a main-scanning direction is as illustrated in FIG. 6A. Here, a peak level of the scanned level around the center of each of the LED blocks 270 and 290 as odd blocks is detected. The LED block 270 and the LED block 290 have a positional relation in which there is no irradiation influence on each other, and thus the peak level is based on the lighted LEDs of each block.

Figure 6B:
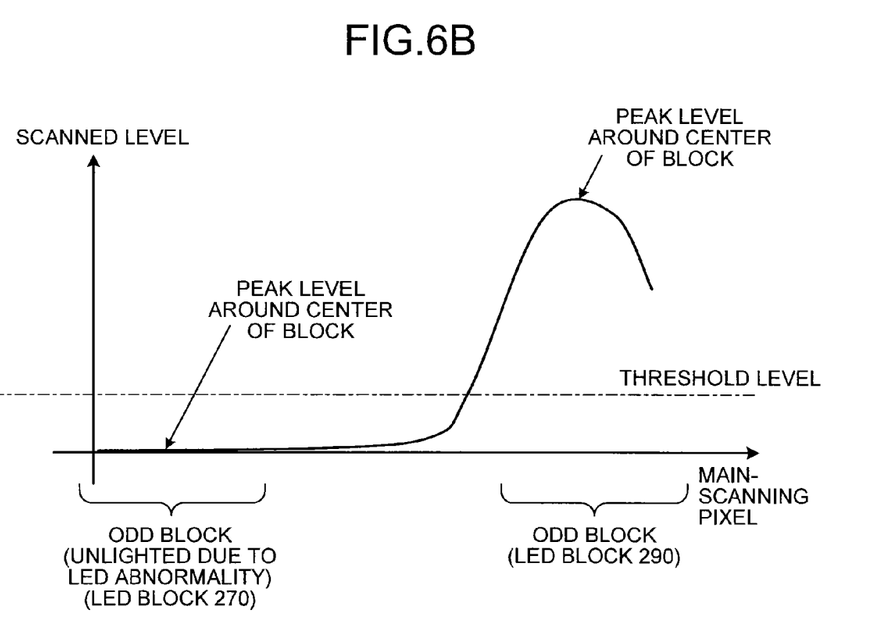

When any of LEDs in the LED block 270 or 290 is in an abnormal mode (except for the short mode), the entire of the LED block 270 or 290 is not lighted, and a peak level of the scanned level in this case is an unlighted level. Therefore, as illustrated in FIG. 6B, the peak level is equal to or smaller than a given value (threshold level) indicating an unlighted level that is set preliminarily, and thus the LED abnormality is detected.

Figure 7A:
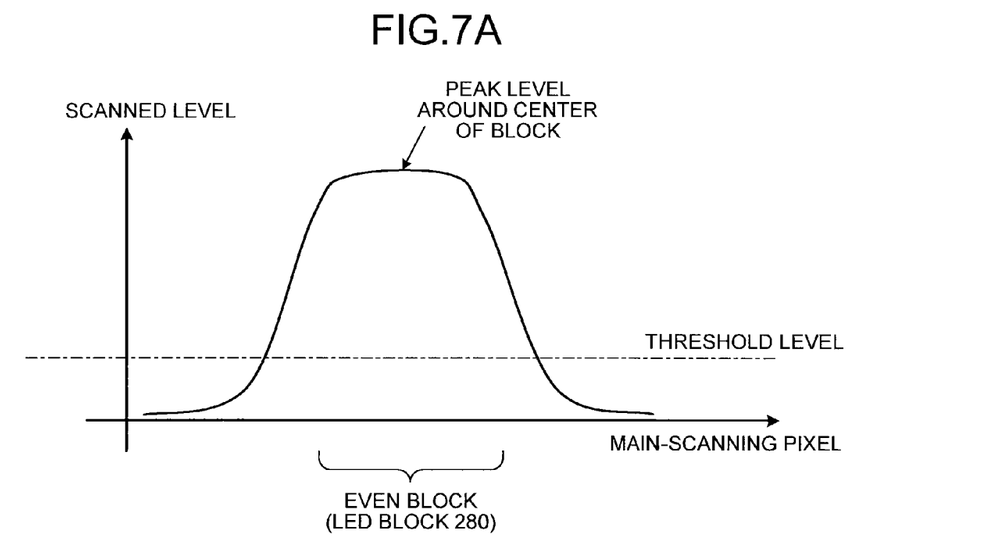
FIGS. 7A and 7B are graphs illustrating a scanned level when even blocks are lighted.

Next, the control of lighting the LED block 280 as an even block is performed. The illuminance distribution in a main-scanning direction is as illustrated in FIG. 7A. Here, a peak level of the scanned level around the center of the LED block 280 as an even block is detected.

Figure 7B:
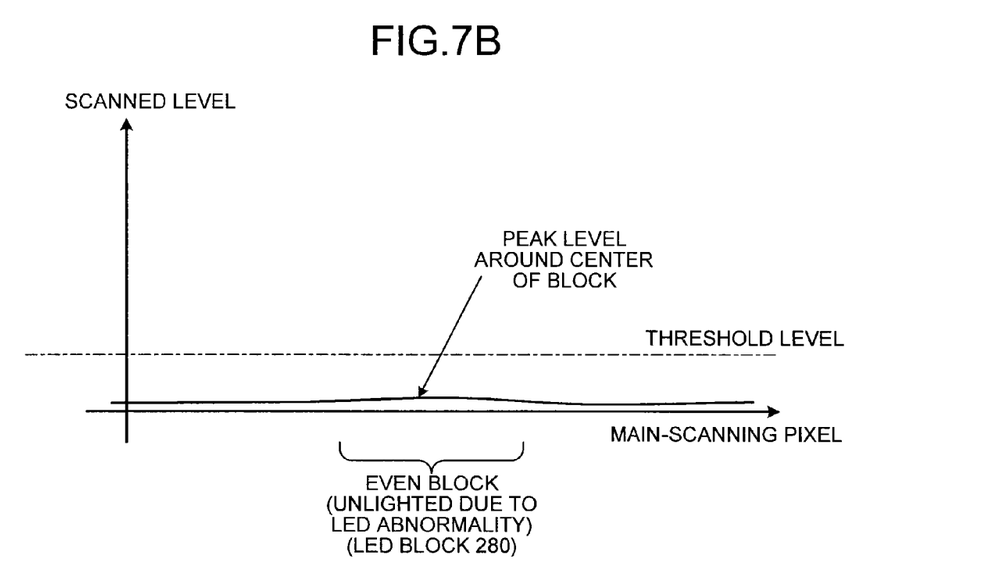

When any of LEDs in the LED block 280 is in an abnormal mode (except for the short mode), the entire of the LED block 280 is not lighted, and a peak level of the scanned level in this case is an unlighted level. Therefore, as illustrated in FIG. 7B, the peak level is equal to or smaller than a given value (threshold level) indicating an unlighted level that is set preliminarily, and thus the LED abnormality is detected.

The abnormality detection can be performed at any time. For example, the abnormality detection can be performed in a state in which temporary gain is set after a main power source of the image reading device 200 is turned on but before gain adjustment is performed. Alternatively, the abnormality detection can be performed immediately before operation of scanning a document, or at timing with certain intervals.

As described above, in the embodiment, it is possible to detect which block includes an abnormal LED with two-time lighting in which the even block and the odd blocks are lighted. In this manner, all of odd blocks or all of even blocks are lighted at the same time, which makes it possible to realize a lighting drive circuit with more simplified circuit configuration. Moreover, the abnormality detection is realized by a program, and thus it is not necessary to include an extra circuit for detecting an abnormal current, for example in the lighting drive circuit. Therefore, it is possible to realize a reading device that can detect abnormality with a simplified configuration.

In addition, regarding the LED blocks adjacent to each other, the positional relation among LEDs is adjusted so that the lighted areas by LEDs do not overlap. Therefore, it is easy to avoid a problem in which light from other LED block increases a peak level of an unlighted block and LED abnormality is not detected accurately.

The LEDs are connected in series in each of the blocks. Therefore, if even one of the LEDs is abnormal (except for in the short mode), the entire block does not light, and thus LED abnormality can be easily detected.

The image reading device of the embodiment that is described above can be configured differently as follows, for example.

In the embodiment, the number of odd blocks is two, and the number of even blocks is one. However, the number of blocks is not limited thereto, and can be changed appropriately depending on a size of a light source.

Although, in the embodiment, the LEDs are connected in series in each of the blocks, they may be connected in parallel. In this mode, it is not possible to exert the effect of facilitating LED abnormality detection in a manner such that, if even one of the LEDs is abnormal, the entire block is unlit. However, when abnormality occurs in LEDs, the scanned revel is declined relatively and thus, with adjustment of a threshold level, etc., the LED abnormality detection can be performed based on variation of a scanned level when the LEDs are connected in parallel.

For abnormality detection, it is possible to set arbitrarily which blocks of even blocks and odd blocks are lighted first.

The number of LEDs in each LED block is not limited to the number in the embodiment, and can be changed. As a light-emitting element, organic electroluminescence (EL), etc., can be used instead of LEDs.

In the embodiment, the image forming apparatus is applied to an MFP that has at least two functions among a copy function, a printer function, a scanner function, and a facsimile function. However, the image forming apparatus of the embodiment can be applied to any image forming apparatus such as a copying machine, a printer, a scanner, and a facsimile.

The present embodiment exerts an effect of detecting abnormality of a light-emitting element with a simplified circuit configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device, comprising:
   a light source that includes a first block and a second block arranged alternately, both blocks including a plurality of light-emitting elements arranged linearly, the first block and the second block lighting independently, and the light-emitting elements in a same block of the first block and the second block lighting at a same time;
   a scanning unit that scans a document by irradiating the document with light from the light source;
   a lighting control unit that lights one of the first block and the second block of the light source and then lights the other;
   a peak level acquiring unit that acquires a peak level of scanned data of each of the first block and the second block while the blocks are lit by the lighting control unit; and
   an abnormality determining unit that determines that the first block is abnormal when the peak level of the first block becomes equal to or smaller than a given value, and determines that the second block is abnormal when the peak level of the second block becomes equal to or smaller than the given value, wherein
   the peak level is the scanned data of a light-emitting element positioned at a center of the corresponding first block and second block, and
   a light-emitting element positioned at an end of the first block is provided so that an emitted light area thereof does not reach the light-emitting element positioned at the center of the adjacent second block, and a light-emitting element positioned at an end of the second block is provided so that an emitted light area thereof does not reach the light-emitting element positioned at the center of the adjacent first block.

2. The image reading device according to claim 1, wherein the light-emitting elements are connected in series in each of the first block and the second block.

3. An image forming apparatus comprising the image reading device according to claim 1.

4. The image reading device according to claim 1, wherein the light-emitting elements are connected in parallel in each of the first block and the second block.

5. The image reading device according to claim 1, wherein the light control unit turns off the one of the first block and the second block when the other of the first block and the second block is lit.

6. The image reading device according to claim 1, wherein the light-emitting elements include organic electroluminescence.

7. A method for determining abnormality in an image reading device comprising a light source that includes a first block and a second block arranged alternately, both blocks including a plurality of light-emitting elements arranged linearly, the first block and the second block lighting independently, and the light-emitting elements in a same block of the first block and the second block lighting at a same time, the method comprising:
   controlling the light source to emit light from the first block and to not emit light from the second block;
   acquiring a peak level of scanned data of the first block while the first block is lit;
   determining whether the first block is abnormal when the peak level of the first block becomes equal to or smaller than a given value;
   controlling the light source to emit light from the second block and to not emit light from the first block;
   acquiring a peak level of scanned data of the second block while the second block is lit; and
   determining whether the second block is abnormal when the peak level of the second block becomes equal to or smaller than a given value, wherein
   the peak level is the scanned data of a light-emitting element positioned at a center of the corresponding first block and second block, and
   a light-emitting element positioned at an end of the first block is provided so that an emitted light area thereof does not reach the light-emitting element positioned at the center of the adjacent second block, and a light-emitting element positioned at an end of the second block is provided so that an emitted light area thereof does not reach the light-emitting element positioned at the center of the adjacent first block.

8. The method for determining abnormality in an image reading device according to claim 7, wherein the light-emitting elements are connected in series in each of the first block and the second block.

9. The method for determining abnormality in an image reading device according to claim 7, wherein the light-emitting elements are connected in parallel in each of the first block and the second block.

10. An image reading device, comprising:
    a light source that includes a first block and a second block arranged alternately, both blocks including a plurality of light-emitting elements arranged linearly, the first block and the second block lighting independently, and the light-emitting elements in a same block of the first block and the second block lighting at a same time;
    means for controlling the light source to emit light from one of the first block and the second block and then to emit light from the other of the first block and the second block;
    means for acquiring a peak level of scanned data of the first block while the first block is lit and a peak level of scanned data of the second block while the second block is lit; and means for determining whether the first block is abnormal when the peak level of the first block becomes equal to or smaller than a given value and whether the second block is abnormal when the peak level of the second block becomes equal to or smaller than a given value, wherein the peak level is the scanned data of a light-emitting element positioned at a center of the corresponding first block and second block, and a light-emitting element positioned at an end of the first block is provided so that an emitted light area thereof does not reach the light-emitting element positioned at the center of the adjacent second block, and a light-emitting element positioned at an end of the second block is provided so that an emitted light area thereof does not reach the light-emitting element positioned at the center of the adjacent first block.

11. A non-transitory computer readable medium that stores computer readable instructions that, when executed by a computer, causes the computer to execute the method according to claim 7.

* * * * *